US009185080B2

(12) United States Patent
Bauernfeind

(10) Patent No.: US 9,185,080 B2
(45) Date of Patent: Nov. 10, 2015

(54) DATA TRANSMITTING DEVICES, DATA RECEIVING DEVICES, METHODS FOR CONTROLLING A DATA TRANSMITTING DEVICE, AND METHODS FOR CONTROLLING A DATA RECEIVING DEVICE

(75) Inventor: Hans Bauernfeind, Nuremberg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 307 days.

(21) Appl. No.: 13/208,428

(22) Filed: Aug. 12, 2011

(65) Prior Publication Data
US 2013/0039493 A1 Feb. 14, 2013

(51) Int. Cl.
H04L 29/06 (2006.01)
G06F 21/60 (2013.01)
G06F 21/85 (2013.01)
H04L 9/14 (2006.01)

(52) U.S. Cl.
CPC .......... *H04L 63/0428* (2013.01); *G06F 21/602* (2013.01); *G06F 21/85* (2013.01); *H04L 9/14* (2013.01); *H04L 63/205* (2013.01); *G06F 2221/2107* (2013.01); *H04L 2209/12* (2013.01)

(58) Field of Classification Search
CPC ..... H04L 9/14; H04L 63/0428; H04L 63/205; H04L 2209/12; G06F 21/602; G06F 21/85; G06F 2221/2107
USPC ........................................................ 380/270
See application file for complete search history.

(56) References Cited

U.S. PATENT DOCUMENTS

| 6,813,355 | B1 * | 11/2004 | Hakaste ........................ 380/270 |
| 7,961,875 | B2 * | 6/2011 | Sachs et al. ..................... 380/29 |
| 8,127,149 | B1 * | 2/2012 | Nachenberg .................. 713/193 |
| 8,412,250 | B2 * | 4/2013 | Hole et al. ..................... 455/515 |
| 8,898,729 | B2 | 11/2014 | Zhang et al. |
| 2007/0060104 | A1 | 3/2007 | Marathe et al. |
| 2007/0098155 | A1 | 5/2007 | Nagasawa et al. |
| 2008/0141021 | A1 | 6/2008 | Hsu et al. |
| 2010/0124332 | A1 | 5/2010 | Arena |
| 2010/0329449 | A1 * | 12/2010 | Minematsu ..................... 380/28 |
| 2012/0066737 | A1 * | 3/2012 | Zhang et al. ....................... 726/1 |
| 2012/0093314 | A1 * | 4/2012 | Jokinen et al. ................ 380/270 |

FOREIGN PATENT DOCUMENTS

| CN | 1938980 A | 3/2007 |
| CN | 1968084 A | 5/2007 |

(Continued)

OTHER PUBLICATIONS

G2-100389, "LS on SACCH Security", 3GPP TSG GERAN WG2 Meeting # 47bis, Vienna, Austria, Oct. 19-22, 2010.
GP-101966, "Answer to LS on SACCH Security", 3GPP TSG-GERAN#48, San Jose Los Cobos, Mexico, Nov. 22-26, 2010.
GP-101787, "On Removing SACCH Ciphering", 3GPP TSG GERAN#48, San José del Cabo, Mexico, Nov. 22-26, 2010.

(Continued)

*Primary Examiner* — Yin-Chen Shaw
*Assistant Examiner* — Narciso Victoria

(57) ABSTRACT

In an embodiment, a data transmitting device may be provided. The data transmitting device may include a ciphering method selector configured to select a ciphering method based on a type of data to be transmitted. The data transmitting device may further include a ciphering circuit configured to cipher the data based on the selected ciphering method. The data transmitting device may further include a transmitter configured to transmit the ciphered data to a data receiving device.

9 Claims, 5 Drawing Sheets

(56) References Cited

FOREIGN PATENT DOCUMENTS

| CN | 101286837 A | 10/2008 |
|---|---|---|
| CN | 101742229 A | 6/2010 |
| CN | 101854625 A | 10/2010 |
| CN | 102104478 A | 6/2011 |
| DE | 10344636 A1 | 5/2005 |
| WO | 2005088893 A1 | 9/2005 |

OTHER PUBLICATIONS

Office action received for German Patent Application No. 10 2012 107 364.3, mailed on Feb. 13, 2014, 6 pages pof Office action and 3 pages of English Translations.

Office action received for Chinese Patent Application No. 201210283914.4, dated Aug. 29, 2014, 6 pages of office action and 11 pages of English translation.

Office action received for CN Patent Application No. 201210283914.4, dated May 5, 2015, 6 pages of office action.

* cited by examiner

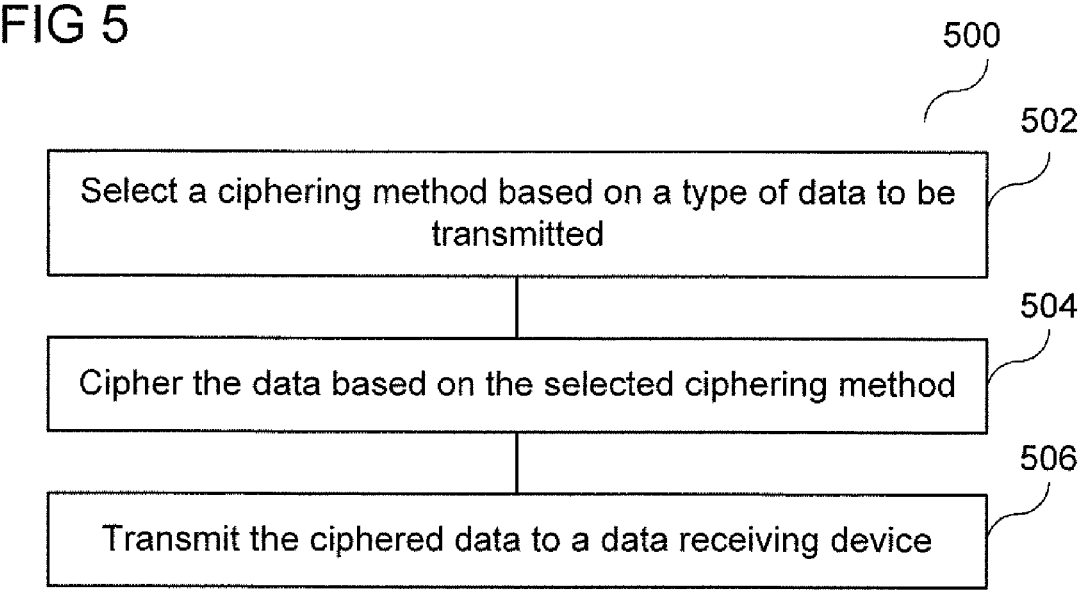

DATA TRANSMITTING DEVICES, DATA RECEIVING DEVICES, METHODS FOR CONTROLLING A DATA TRANSMITTING DEVICE, AND METHODS FOR CONTROLLING A DATA RECEIVING DEVICE

TECHNICAL FIELD

Embodiments relate generally to data transmitting devices, data receiving devices, methods for controlling a data transmitting device, and methods for controlling a data receiving device.

BACKGROUND

Data to be transmitted between a mobile radio base station and a mobile radio communication terminal is desired to be ciphered.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 5 shows a flow diagram illustrating a method for controlling a data transmitting device in accordance with an embodiment;

FIG. 6 shows a flow diagram illustrating a method for controlling a data receiving device in accordance with an embodiment;

DESCRIPTION

Figure 1:
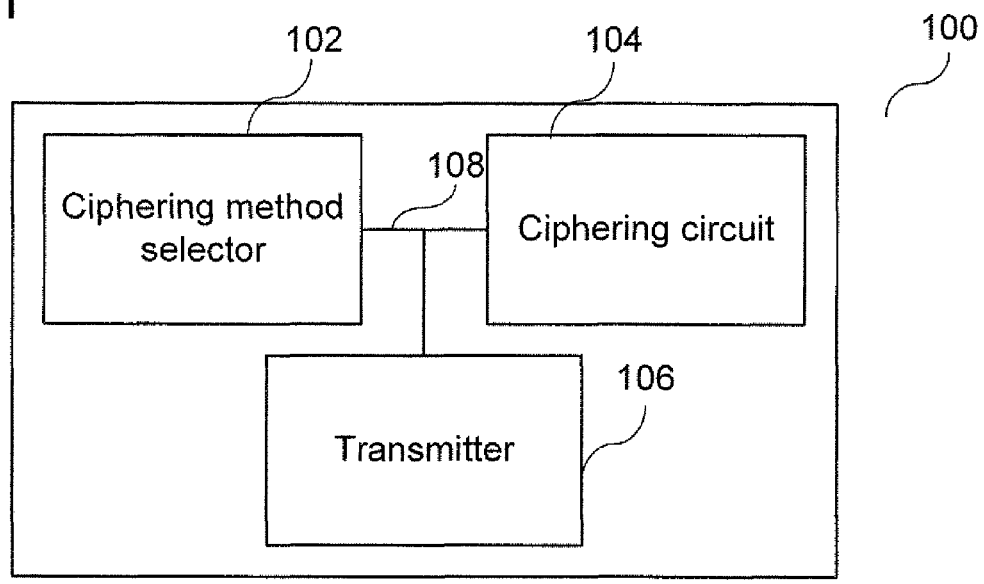
FIG. 1 shows a data transmitting device in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

A mobile radio communication terminal according to various embodiments may be a device configured for wired communication, for example a desktop computer or laptop, or for wireless communication, for example a radio communication device. In various embodiments, a mobile radio communication terminal may be an end-user mobile device (MD), an M2M (machine to machine) device, or an MTC (machine type communication) device. In various embodiments, a mobile radio communication terminal may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

A mobile radio communication network device may be understood as a device that is provided (for example stationary) in a mobile radio communication network. For example, the mobile radio communication network device may be or may be included in a mobile radio base station, a NodeB, an eNodeB (evolved NodeB), an MME (Mobility Management Entity), a Serving Gateway (S-GW), or a Serving GPRS (General Packet Radio Service) Support Node (SGSN).

The data transmitting device may include a memory which may for example be used in the processing carried out by the data transmitting device. The data receiving device may include a memory which may for example be used in the processing carried out by the data receiving device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory), a PCRAM (Phase Change Random Access Memory), or a static RAM (SRAM). A memory used in the embodiments may be a non-volatile memory, for example battery backed DRAM or SRAM or a hard disk.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor) or a Field Programmable Gate Array (FPGA). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific data transmitting device or data receiving device may also hold for any data transmitting device or data receiving device described herein. It will be understood that any property described herein for a specific method may also hold for any method described herein.

FIG. 1 shows a data transmitting device 100 in accordance with an embodiment. The data transmitting device 100 may include a ciphering method selector 102 configured to select a ciphering method based on a type of data to be transmitted. The data transmitting device 100 may further include a ciphering circuit 104 configured to cipher the data based on the selected ciphering method. The data transmitting device 100 may further include a transmitter 106 configured to transmit the ciphered data to a data receiving device (for example the data receiving device 300 of FIG. 3 or the data receiving device 400 of FIG. 4). The ciphering method selector 102, the ciphering circuit 104, and the transmitter 106 may be coupled with each other, e.g. via an optical connection and/or an electrical connection 108 such as e.g. a cable or a computer bus or via any other suitable electrical connection to exchange electrical signals.

According to various embodiments, the ciphering method selector may be configured to select a ciphering method based on the type of channel (for example logical channel or physical channel), and/or the protocol used for transmission (for example short messages may be transmitted on circuit switched channels as well as on packet switched channels with GPRS).

According to various embodiments, the data transmitting device 100 may be configured as a mobile radio communication terminal. According to various embodiments, the data receiving device may be configured as a mobile radio communication network device.

According to various embodiments, the data transmitting device 100 may be configured as a mobile radio communication network device. According to various embodiments, the data receiving device may be configured as a mobile radio communication terminal.

According to various embodiments, both the data transmitting device 100 and the data receiving device may be configured as mobile radio communication terminals, for example for peer-to-peer communication.

According to various embodiments, the data transmitting device 100 may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and Zig-Bee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), DVB-H (digital video broadcasting-handhelds), DVB-S (digital video broadcasting-satellite), DVB-T (digital video broadcasting-terrestrial), DAB (digital audio broadcasting), DMB (digital multimedia broadcasting), and/or satellite systems like Inmarsat, ICO, ICO-G1, Iridium and/or Thuraya.

Figure 2:
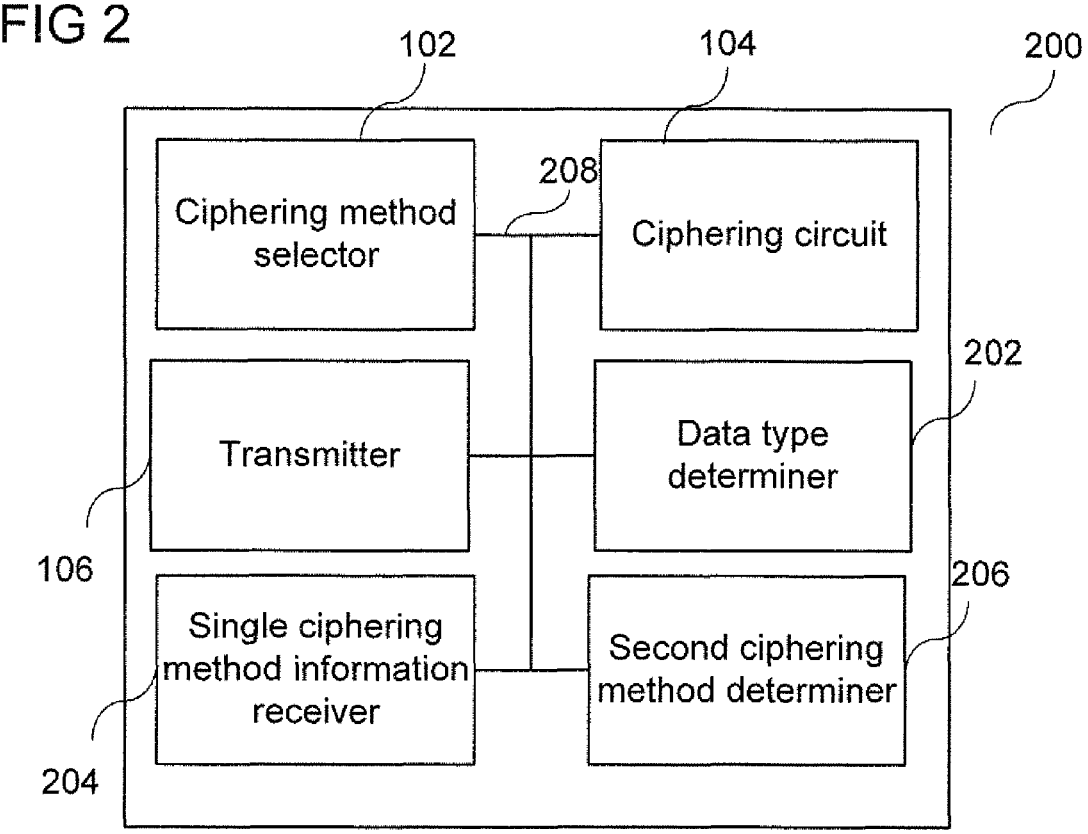
FIG. 2 shows a data transmitting device in accordance with an embodiment.

FIG. 2 shows a data transmitting device 200 in accordance with an embodiment. The data transmitting device 200 may, similar to the data transmitting device 100 of FIG. 1, include a ciphering method selector 102. The data transmitting device 200 may, similar to the data transmitting device 100 of FIG. 1, further include a ciphering circuit 104. The data transmitting device 200 may, similar to the data transmitting device 100 of FIG. 1, further include a transmitter 106. The data transmitting device 200 may further include a data type determiner 202, like will be described in more detail below. The data transmitting device 200 may further include a single ciphering method information receiver 204, like will be described in more detail below. The data transmitting device 200 may further include a second ciphering method determiner 206, like will be described in more detail below. The ciphering method selector 102, the ciphering circuit 104, the transmitter 106, the data type determiner 202, the single ciphering method information receiver 204, and the second ciphering method determiner 206 may be coupled with each other, e.g. via an optical connection and/or an electrical connection 208 such as e.g. a cable or a computer bus or via any other suitable electrical connection to exchange electrical signals.

According to various embodiments, the data type determiner 202 may be configured to determine the type of data to be transmitted.

According to various embodiments, the type of data to be transmitted may be based on the channel on which the data is to be transmitted.

According to various embodiments, a first type of data may include or may be data that is to be transmitted on a first channel.

According to various embodiments, the first type of data may include or may be at least one of short message services and supplementary services.

According to various embodiments, the first channel may be a slow associated control channel.

According to various embodiments, a second type of data may include or may be data that is to be transmitted on a second channel.

According to various embodiments, the second type of data may include or may be voice call data.

According to various embodiments, the second channel may be a traffic channel.

According to various embodiments, a first type of data may include or may be data that is transmitted in a circuit switched mode.

According to various embodiments, a second type of data may be data that is transmitted in a packet switched mode.

According to various embodiments, a first type of data may be data that is transmitted to the data receiving device after a user of the data receiving device has accepted receiving the data.

According to various embodiments, a second type of data may be data that is transmitted to the data receiving device independent from whether a user of the data receiving device has accepted receiving the data.

According to various embodiments, a first type of data may include or may be data which may be known to an attacker. In other words, a first type of data may include or may be data for which an attacker has a high chance of knowing the data.

According to various embodiments, a second type of data may include or may be data which may not be known to an attacker. In other words, a second type of data may be data for which an attacker has a low chance of knowing the data.

According to various embodiments, the ciphering method selector 102 may be configured to select a ciphering method from a plurality of ciphering methods, wherein the plurality of ciphering methods may include or may be a first ciphering method and a second ciphering method, wherein the first ciphering method may be different from the second ciphering method.

According to various embodiments, the data transmitting device 200 may further include a multiple ciphering method information receiver (not shown) configured to receive information indicating the first ciphering method and the second ciphering method.

According to various embodiments, the single ciphering method information receiver 204 may be configured to receive information indicating the first ciphering method. According to various embodiments, the second ciphering method determiner 206 may be configured to determine information indicating the second ciphering method based on the received information indicating the first ciphering method.

According to various embodiments, the first ciphering method may be based on a first ciphering key and the second ciphering method may be based on a second ciphering key, wherein the first ciphering key may be different from the second ciphering key.

According to various embodiments, the data transmitting device 200 may further include a multiple ciphering key information receiver (not shown) configured to receive information indicating the first ciphering key and the second ciphering key.

According to various embodiments, the data transmitting device 200 may further include a single ciphering key information receiver (not shown) configured to receive information indicating the first ciphering key. According to various embodiments, the data transmitting device 200 may further include a second ciphering key determiner (not shown) configured to determine information indicating the second ciphering key based on the received information indicating the first ciphering key.

Figure 3:
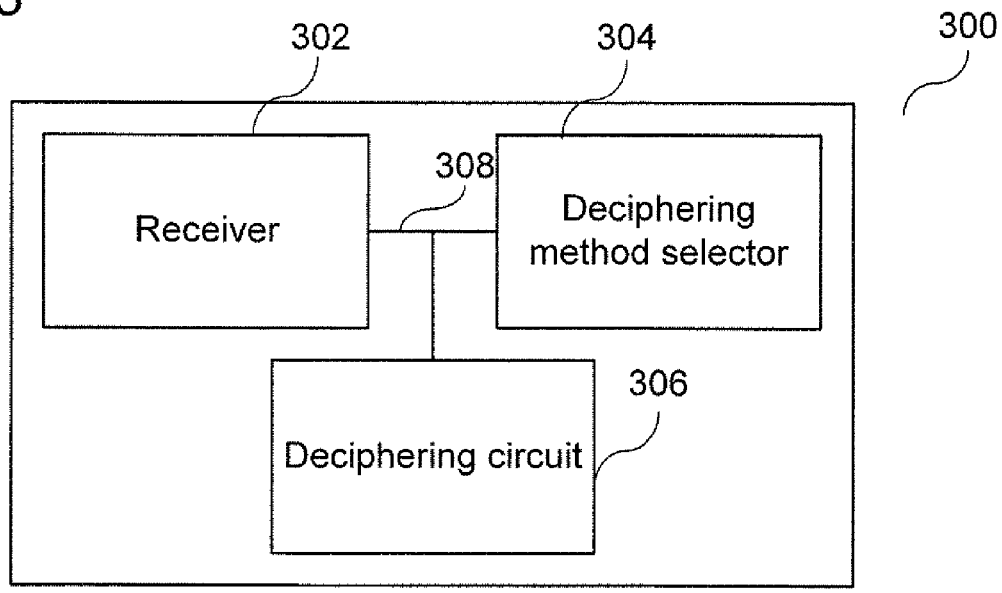
FIG. 3 shows a data receiving device in accordance with an embodiment.

FIG. 3 shows a data receiving device 300 in accordance with an embodiment. The data receiving device 300 may include a receiver 302 configured to receive ciphered data from a data transmitting device (for example the data transmitting device 100 of FIG. 1 or the data transmitting device 200 of FIG. 2). The data receiving device 300 may further include a deciphering method selector 304 configured to select a deciphering method based on a type of the ciphered data. The data receiving device 300 may further include a deciphering circuit 306 configured to decipher the ciphered data based on the selected deciphering method. The receiver 302, the deciphering method selector 304, and the deciphering circuit 306 may be coupled with each other, e.g. via an optical connection and/or an electrical connection 308 such as e.g. a cable or a computer bus or via any other suitable electrical connection to exchange electrical signals.

According to various embodiments, the deciphering method selector may be configured to select a deciphering method based on the type of channel (for example logical channel or physical channel), and/or the protocol used for transmission (for example short messages may be transmitted on circuit switched channels as well as on packet switched channels with GPRS).

According to various embodiments, the data receiving device 300 may be configured as a mobile radio communication terminal. According to various embodiments, the data transmitting device may be configured as a mobile radio communication network device.

According to various embodiments, the data receiving device 300 may be configured as a mobile radio communication network device. According to various embodiments, the data transmitting device may be configured as a mobile radio communication terminal.

According to various embodiments, both the data receiving device 300 and the data transmitting device may be configured as mobile radio communication terminals, for example for peer-to-peer communication.

According to various embodiments, the data receiving device 300 may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), DVB-H (digital video broadcasting-handhelds), DVB-S (digital video broadcasting-satellite), DVB-T (digital video broadcasting-terrestrial), DAB (digital audio broadcasting), DMB (digital multimedia broadcasting), and/or satellite systems like Inmarsat, ICO, ICO-G1, Iridium and/or Thuraya.

Figure 4:
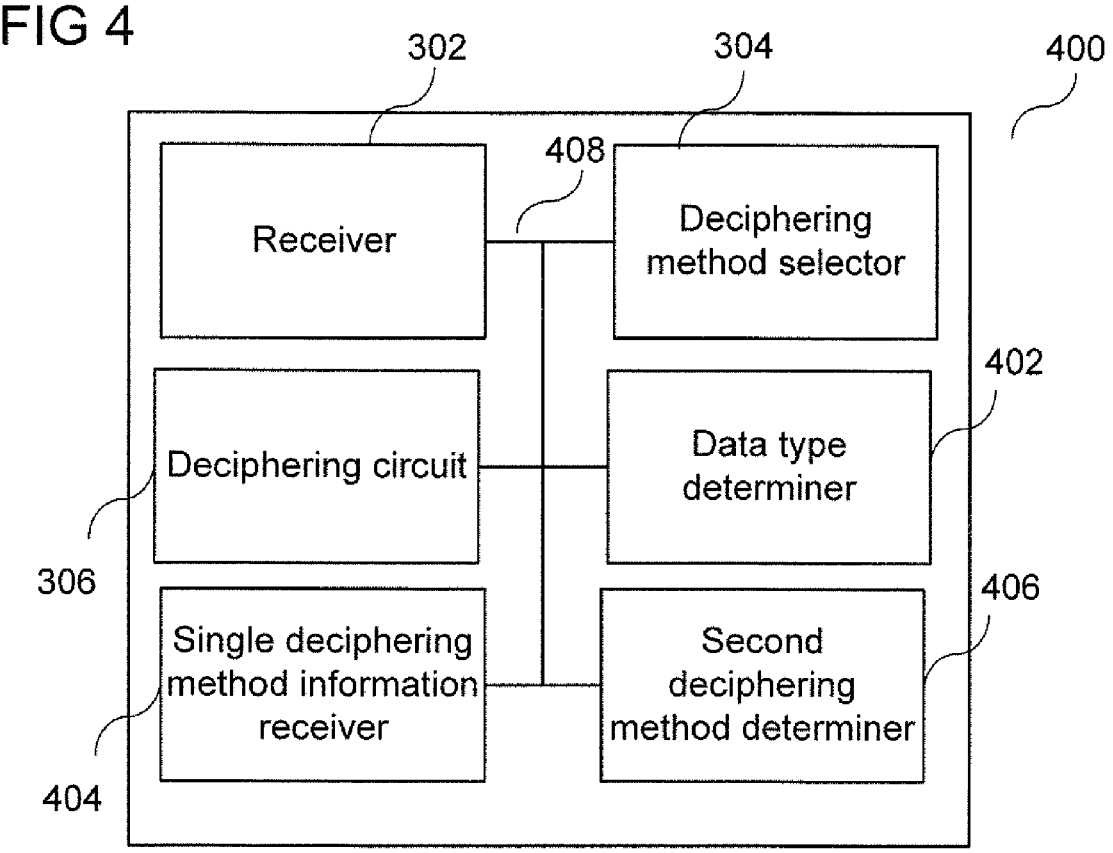
FIG. 4 shows a data receiving device in accordance with an embodiment.

FIG. 4 shows a data receiving device 400 in accordance with an embodiment. The data receiving device 400 may, similar to the data receiving device 300 of FIG. 3, include a receiver 302. The data receiving device 400 may, similar to the data receiving device 300 of FIG. 3, further include a deciphering method selector 304. The data receiving device 400 may, similar to the data receiving device 300 of FIG. 3, further include a deciphering circuit 306. The data receiving device 400 may further include a data type determiner 402, like will be described in more detail below. The data receiving device 400 may further include a single deciphering method information receiver 404, like will be described in more detail below. The data receiving device 400 may further include a second deciphering method determiner 406, like will be described in more detail below. The receiver 302, the deciphering method selector 304, the deciphering circuit 306, the data type determiner 402, the single deciphering method information receiver 404, and the second deciphering method determiner 406 may be coupled with each other, e.g. via an optical connection and/or an electrical connection 308 such as e.g. a cable or a computer bus or via any other suitable electrical connection to exchange electrical signals.

According to various embodiments, the data type determiner 402 may be configured to determine the type of the ciphered data.

According to various embodiments, the type of the ciphered data may be based on the channel on which the ciphered data is received.

According to various embodiments, a first type of ciphered data may include or may be ciphered data that is received on a first channel.

According to various embodiments, the first type of ciphered data may include or may be at least one of ciphered short message services and ciphered supplementary services.

According to various embodiments, the first channel may be a slow associated control channel.

According to various embodiments, a second type of ciphered data may include or may be ciphered data that is received on a second channel.

According to various embodiments, the second type of ciphered data may include or may be ciphered voice call data.

According to various embodiments, the second channel may be a traffic channel.

According to various embodiments, the first type of ciphered data may include or may be ciphered data that is received in a circuit switched mode.

According to various embodiments, a second type of ciphered data may include or may be ciphered data that is transmitted in a packet switched mode.

According to various embodiments, a first type of ciphered data may include or may be ciphered data that is received after a user of the data receiving device 400 has accepted receiving the data.

According to various embodiments, a second type of ciphered data may include or may be ciphered data that is received independent from whether a user of the data receiving device 400 has accepted receiving the data.

According to various embodiments, a first type of ciphered data may include or may be ciphered data which may be known to an attacker. In other words, a first type of ciphered data may be ciphered data for which an attacker has a high chance of knowing the unciphered data.

According to various embodiments, a second type of ciphered data may include or may be ciphered data which may not be known to an attacker. In other words, a first type of ciphered data may be ciphered data for which an attacker has a low chance of knowing the unciphered data.

According to various embodiments, the deciphering method selector 304 may be configured to select a deciphering method from a plurality of deciphering methods, wherein the plurality of deciphering methods may include or may be a first deciphering method and a second deciphering method, wherein the first deciphering method may be different from the second deciphering method.

According to various embodiments, the data receiving device 400 may further include a multiple deciphering method information receiver (not shown) configured to receive information indicating the first deciphering method and the second deciphering method.

According to various embodiments, the single deciphering method information receiver 404 may be configured to receive information indicating the first deciphering method. According to various embodiments, the second deciphering method determiner 406 may be configured to determine information indicating the second deciphering method based on the received information indicating the first deciphering method.

According to various embodiments, the first deciphering method may be based on a first deciphering key and the second deciphering method may be based on a second deciphering key, wherein the first deciphering key may be different from the second deciphering key.

According to various embodiments, the data receiving device 400 may further include a multiple deciphering key information receiver (not shown) configured to receive information indicating the first deciphering key and the second deciphering key.

According to various embodiments, the data receiving device 400 may further include a single deciphering key information receiver (not shown) configured to receive information indicating the first deciphering key. According to various embodiments, the data receiving device 400 may further include a second deciphering key determiner (not shown) configured to determine information indicating the second deciphering key based on the received information indicating the first deciphering key.

FIG. 5 shows a flow diagram 500 illustrating a method for controlling a data transmitting device in accordance with an embodiment. In 502, a ciphering method may be selected based on a type of data to be transmitted. In 504, the data may be ciphered based on the selected ciphering method. In 506, the ciphered data may be transmitted to a data receiving device.

According to various embodiments, the ciphering method may be selected based on the type of channel (for example logical channel or physical channel), and/or the protocol used for transmission (for example short messages may be transmitted on circuit switched channels as well as on packet switched channels with GPRS).

According to various embodiments, the data transmitting device may be configured as a mobile radio communication terminal. According to various embodiments, the data receiving device may be configured as a mobile radio communication network device.

According to various embodiments, the data transmitting device may be configured as a mobile radio communication network device. According to various embodiments, the data receiving device may be configured as a mobile radio communication terminal.

According to various embodiments, both the data transmitting device and the data receiving device may be configured as mobile radio communication terminals, for example for peer-to-peer communication.

According to various embodiments, the data transmitting device may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and Zig-Bee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), DVB-H (digital video broadcasting-handhelds), DVB-S (digital video broadcasting-satellite), DVB-T (digital video broadcasting-terrestrial), DAB (digital audio broadcasting), DMB (digital multimedia broadcasting), and/or satellite systems like Inmarsat, ICO, ICO-G1, Iridium and/or Thuraya.

According to various embodiments, the type of data to be transmitted may be determined.

According to various embodiments, the type of data to be transmitted may be determined based on the channel on which the data is to be transmitted.

According to various embodiments, a first type of data may include or may be data that is to be transmitted on a first channel.

According to various embodiments, the first type of data may include or may be at least one of short message services and supplementary services.

According to various embodiments, the first channel may be a slow associated control channel.

According to various embodiments, a second type of data may include or may be data that is to be transmitted on a second channel.

According to various embodiments, the second type of data may include or may be voice call data.

According to various embodiments, the second channel may be a traffic channel.

According to various embodiments, a first type of data may include or may be data that is transmitted in a circuit switched mode.

According to various embodiments, a second type of data may include or may be data that is transmitted in a packet switched mode.

According to various embodiments, a first type of data may include or may be data that is transmitted to the data receiving device after a user of the data receiving device has accepted receiving the data.

According to various embodiments, a second type of data may include or may be data that is transmitted to the data receiving device independent from whether a user of the data receiving device has accepted receiving the data.

According to various embodiments, a first type of data may include or may be data which may be known to an attacker. In other words, a first type of data may include or may be data for which an attacker has a high chance of knowing the data.

According to various embodiments, a second type of data may include or may be data which may not be known to an attacker. In other words, a second type of data may include or may be data for which an attacker has a low chance of knowing the data.

According to various embodiments, a ciphering method may be selected from a plurality of ciphering methods, wherein the plurality of ciphering methods may include or may be a first ciphering method and a second ciphering method, wherein the first ciphering method may be different from the second ciphering method.

According to various embodiments, information indicating the first ciphering method and the second ciphering method may be received.

According to various embodiments, information indicating the first ciphering method may be received. According to various embodiments, information indicating the second ciphering method may be determined based on the received information indicating the first ciphering method.

According to various embodiments, the first ciphering method may be based on a first ciphering key and the second ciphering method may be based on a second ciphering key, wherein the first ciphering key may be different from the second ciphering key.

According to various embodiments, information indicating the first ciphering key and the second ciphering key may be received.

According to various embodiments, information indicating the first ciphering key may be received. According to various embodiments, information indicating the second ciphering key may be determined based on the received information indicating the first ciphering key.

FIG. 6 shows a flow diagram 600 illustrating a method for controlling a data receiving device in accordance with an embodiment. In 602, ciphered data may be received from a data transmitting device. In 604, a deciphering method may be selected based on a type of the ciphered data. In 606, the ciphered data may be deciphered based on the selected deciphering method.

According to various embodiments, the deciphering method may be selected based on the type of channel (for example logical channel or physical channel), and/or the protocol used for transmission (for example short messages may be transmitted on circuit switched channels as well as on packet switched channels with GPRS).

According to various embodiments, the data receiving device may be configured as a mobile radio communication terminal. According to various embodiments, the data transmitting device may be configured as a mobile radio communication network device.

According to various embodiments, the data receiving device may be configured as a mobile radio communication network device. According to various embodiments, the data transmitting device may be configured as a mobile radio communication terminal.

According to various embodiments, both the data receiving device and the data transmitting device may be configured as mobile radio communication terminals, for example for peer-to-peer communication.

According to various embodiments, the data receiving device may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface, a Bluetooth radio communication technology, an Ultra Wide Band (UWB) radio communication technology, a Wireless Local Area Network radio communication technology (e.g. according to an IEEE 802.11 (e.g. IEEE 802.11n) radio communication standard)), IrDA (Infrared Data Association), Z-Wave and Zig-Bee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), DVB-H (digital video broadcasting-handhelds), DVB-S (digital video broadcasting-satellite), DVB-T (digital video broadcasting-terrestrial), DAB (digital audio broadcasting), DMB (digital multimedia broadcasting), and/or satellite systems like Inmarsat, ICO, ICO-G1, Iridium and/or Thuraya.

According to various embodiments, the type of the ciphered data may be determined.

According to various embodiments, the type of the ciphered data may be determined based on the channel on which the ciphered data is received.

According to various embodiments, a first type of ciphered data may include or may be ciphered data that is received on a first channel.

According to various embodiments, the first type of ciphered data may include or may be at least one of ciphered short message services and ciphered supplementary services.

According to various embodiments, the first channel may be a slow associated control channel.

According to various embodiments, a second type of ciphered data may include or may be ciphered data that is received on a second channel.

According to various embodiments, the second type of ciphered data may include or may be ciphered voice call data.

According to various embodiments, the second channel may be a traffic channel.

According to various embodiments, a first type of ciphered data may include or may be ciphered data that is received in a circuit switched mode.

According to various embodiments, a second type of ciphered data may include or may be ciphered data that is transmitted in a packet switched mode.

According to various embodiments, a first type of ciphered data may include or may be ciphered data that is received after a user of the data receiving device has accepted receiving the data.

According to various embodiments, a second type of ciphered data may include or may be ciphered data that is received independent from whether a user of the data receiving device has accepted receiving the data.

According to various embodiments, a first type of ciphered data may include or may be ciphered data which may be known to an attacker. In other words, a first type of ciphered data may include or may be ciphered data for which an attacker has a high chance of knowing the unciphered data.

According to various embodiments, a second type of ciphered data may include or may be ciphered data which may not be known to an attacker. In other words, a first type of ciphered data may include or may be ciphered data for which an attacker has a low chance of knowing the unciphered data.

According to various embodiments, a deciphering method may be selected from a plurality of deciphering methods, wherein the plurality of deciphering methods may include or may be a first deciphering method and a second deciphering method, wherein the first deciphering method may be different from the second deciphering method.

According to various embodiments, information indicating the first deciphering method and the second deciphering method may be received.

According to various embodiments, information indicating the first deciphering method may be received. According to various embodiments, information indicating the second deciphering method may be determined based on the received information indicating the first deciphering method.

According to various embodiments, the first deciphering method may be based on a first deciphering key and the second deciphering method may be based on a second deciphering key, wherein the first deciphering key may be different from the second deciphering key.

According to various embodiments, information indicating the first deciphering key and the second deciphering key may be received.

According to various embodiments, information indicating the first deciphering key may be received. According to various embodiments, information indicating the second deciphering key may be determined based on the received information indicating the first deciphering key.

Figure 7:
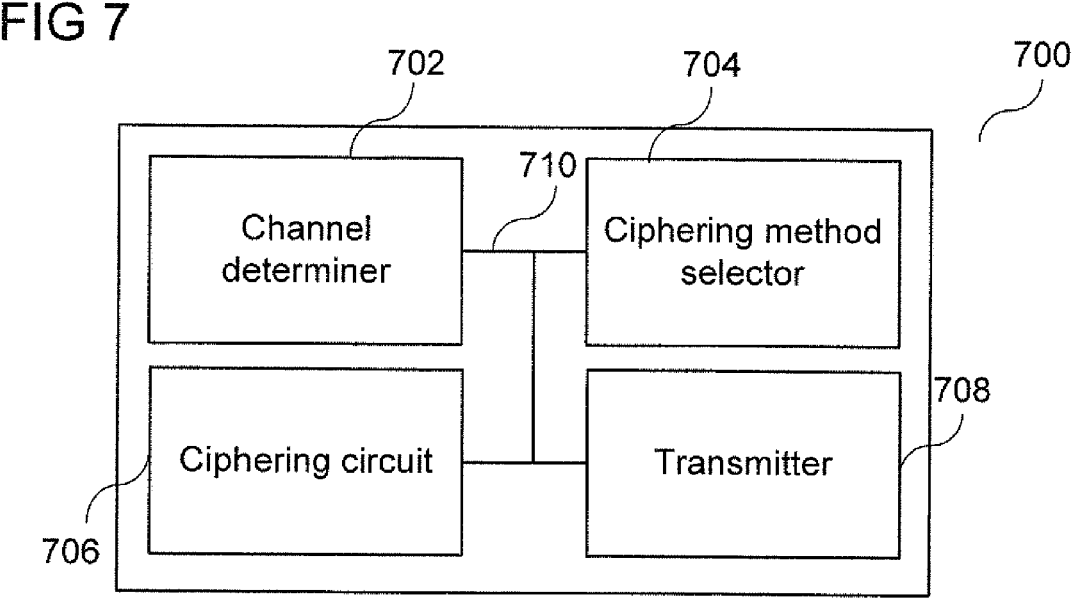
FIG. 7 shows a data transmitting device in accordance with an embodiment.

FIG. 7 shows a data transmitting device 700 in accordance with an embodiment. The data transmitting device 700 may include a channel determiner 702 configured to determine a channel on which the data is to be transmitted to a data receiving device. The data transmitting device 700 may further include a ciphering method selector 704 configured to select a ciphering method based on the determined channel. The data transmitting device 700 may further include a ciphering circuit 706 configured to cipher the data based on the selected ciphering method. The data transmitting device 700 may further include a transmitter 708 configured to transmit the ciphered data to the data receiving device. The channel determiner 702, ciphering method selector 704, ciphering circuit 706, and transmitter 708 may be coupled with each other, e.g. via an optical connection and/or an electrical connection 710 such as e.g. a cable or a computer bus or via any other suitable electrical connection to exchange electrical signals.

Figure 8:
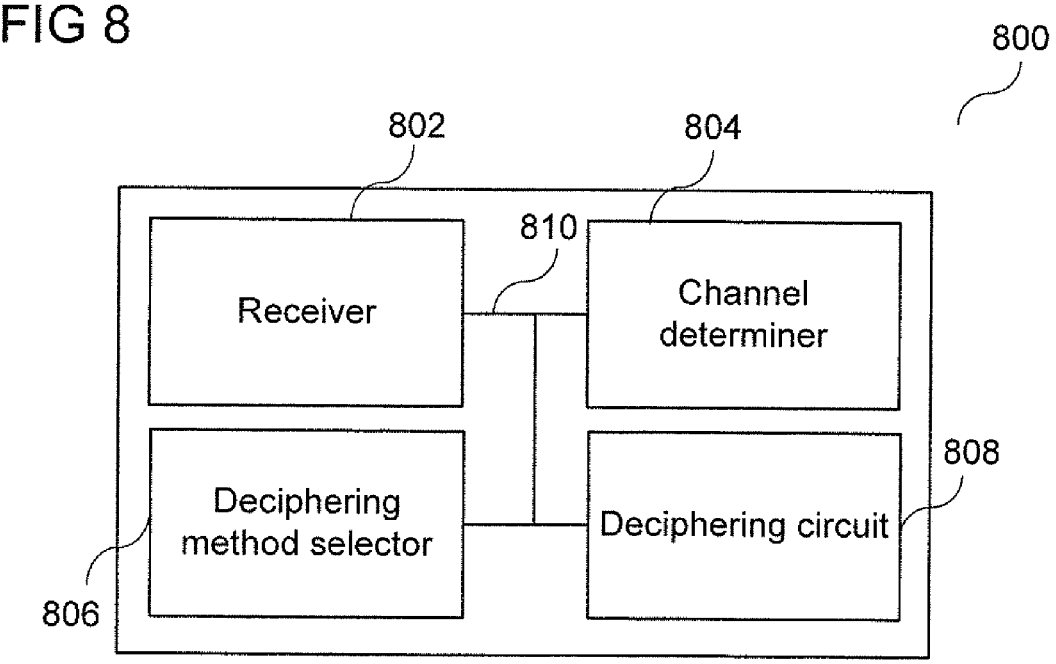
FIG. 8 shows a data receiving device in accordance with an embodiment.

FIG. 8 shows a data receiving device 800 in accordance with an embodiment. The data receiving device 800 may include a receiver 802 configured to receive ciphered data from a data transmitting device. The data receiving device 800 may further include a channel determiner 804 configured to determine a channel on which the ciphered data has been received. The data receiving device 800 may further include a deciphering method selector 806 configured to select a deciphering method based on the determined channel. The data receiving device 800 may further include a deciphering circuit 808 configured to decipher the ciphered data based on the selected deciphering method. The receiver 802, the channel determiner 804, the deciphering method selector 806, and the deciphering circuit 808 may be coupled with each other, e.g. via an optical connection and/or an electrical connection 810 such as e.g. a cable or a computer bus or via any other suitable electrical connection to exchange electrical signals.

Figure 9:
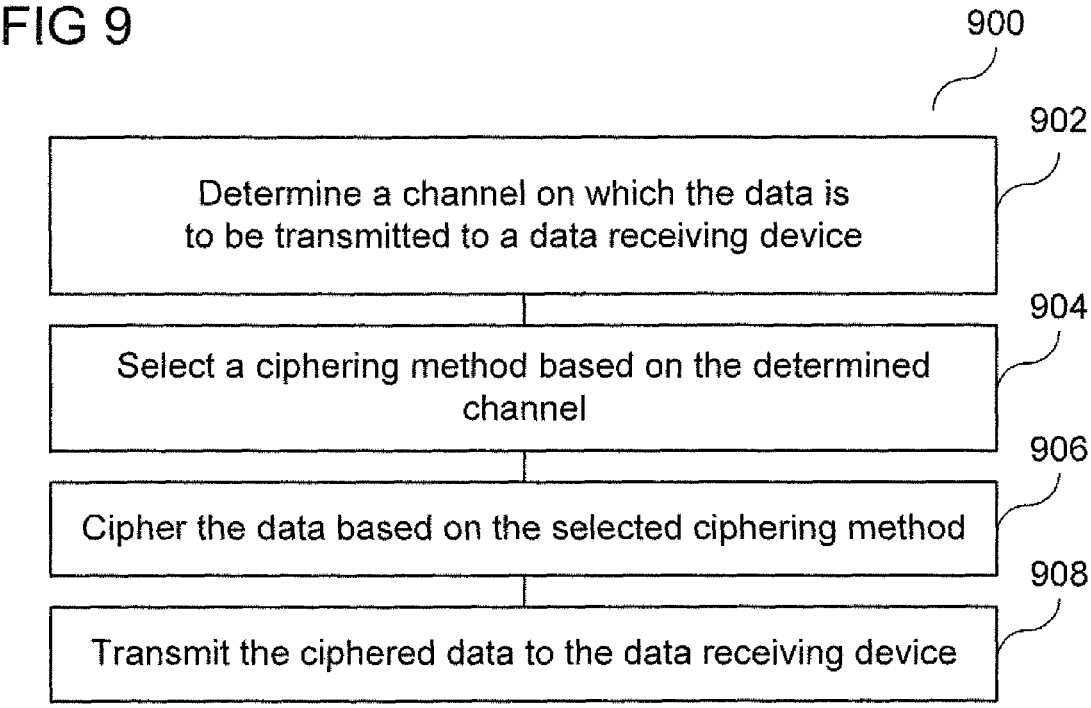
FIG. 9 shows a flow diagram illustrating a method for controlling a data transmitting device in accordance with an embodiment.

FIG. 9 shows a flow diagram 900 illustrating a method for controlling a data transmitting device in accordance with an embodiment. In 902, a channel on which the data is to be transmitted to a data receiving device may be determined. In 904, a ciphering method may be selected based on the determined channel. In 906, the data may be ciphered based on the selected ciphering method. In 908, the ciphered data may be transmitted to the data receiving device.

Figure 10:
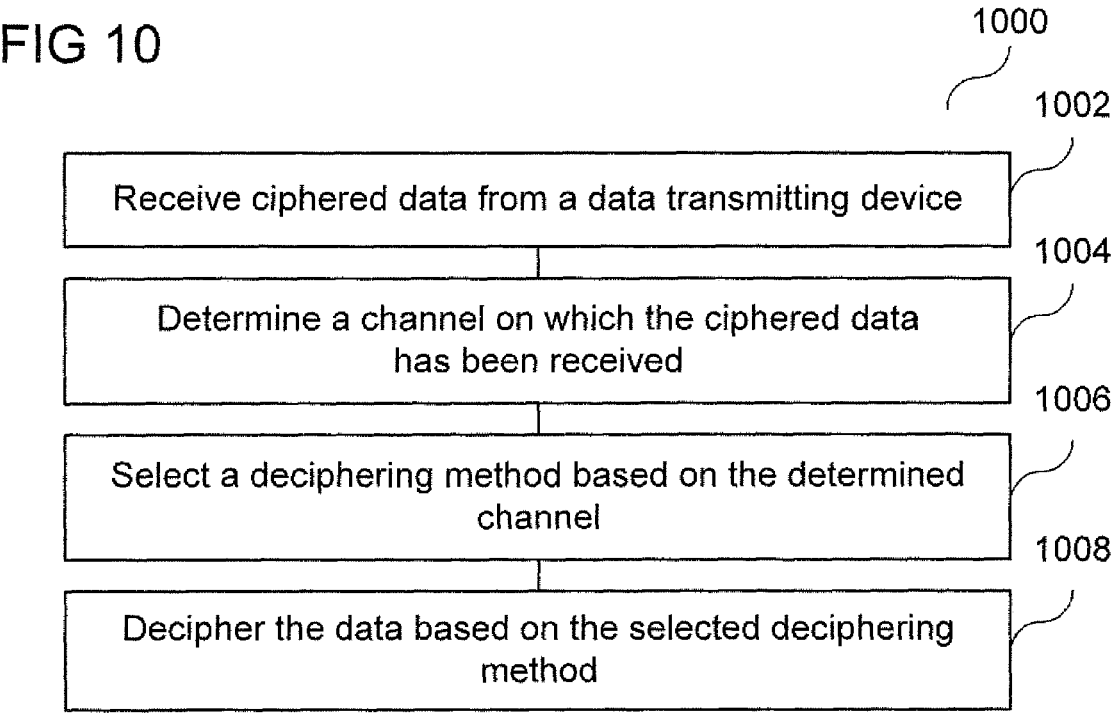
FIG. 10 shows a flow diagram illustrating a method for controlling a data receiving device in accordance with an embodiment.

FIG. 10 shows a flow diagram 1000 illustrating a method for controlling a data receiving device in accordance with an embodiment. In 1002, ciphered data may be received from a data transmitting device. In 1004, a channel on which the ciphered data has been received may be determined. In 1006, a deciphering method may be selected based on the determined channel. In 1008, the ciphered data may be deciphered based on the selected deciphering method.

Data to be transmitted between a mobile radio base station and a mobile radio communication terminal may be desired to be ciphered.

According to various embodiments, Selective Ciphering on SACCH (slow associated control channel) using A5/1 may be provided.

In 3GPP GERAN (GSM EDGE Radio Access Network), measures against known-plain-text-attacks originated from known information sent on SACCH during speech (or data) calls are discussed. The repeated information may be sent unciphered, and only relevant data, such as SMS (short message service) may be ciphered. This counter measure may not prevent from known, ciphered data being injected on SACCH by an attacker sending an SMS to the attacked person.

According to various embodiments, devices and methods may be provided that use a cipher key different from the one used for ciphering on TCH (traffic channel) for the encryption of SMS, and SS (supplementary services).

Furthermore a possible method for derivation of a cipher key for ciphering on SACCH may be provided.

In 3GPP GERAN, attacks on phone calls ciphered with the encryption method A5/1 via a security breach constituted by known plain text sent on SACCH are discussed.

On SACCH, repeatedly SI5/5bis/5ter and SI6 (where SI stands for system information) messages may be sent on the downlink, which may contain only slowly (if at all) varying information, such as neighbor cell frequency lists, cell ID (identifier), location area ID and so on. Once an attacker has acquired this information, e.g. by recording signaling messages during an own phone call on the same cell, the obtained information sent on SACCH may be used as known plain text. By means of this known information, the cipher text of an attacked phone call may be extracted from the encrypted bits (if the phone call has been recorded, the bits of the cipher text c may be extracted from the encrypted bits e by means of the known plain text t by a simple exclusive-or operation: c=e xor t). The cipher text then may be used to attack and decode the rest of the phone call.

This may be a problem for network operators. Stronger methods such as A5/3 or A5/4 may be used, but may desire hardware upgrades in the base station, and may not be supported by legacy mobile phones. Hence the use of these methods may only be a long term solution.

Several ways exist to circumvent the problem of known plain text on SACCH, while still using the well supported A5/1. For example, the content of the SI messages sent on SACCH may be varied so as to make their content harder to predict, e.g. by using different encodings for the neighbor cell lists. This however has the drawback that there might be implementation dependent compatibility problems with some phones. Also, the possibilities to vary this information may be limited.

Another way is to selectively cipher the SACCH and not to encrypt the SI messages, and only to encrypt the transmission of short messages (and for example also the invocation of supplementary services). This way aims at removing ciphering from known information, and to only cipher messages containing unpredictable information, such as SMS, thus making it harder to deduce the used cipher text. Two methods for the mobile station to decode messages on SACCH may be used. In one way, it may be tried to decode the SACCH block without decryption, and, if this fails, to decode the block after applying decryption. The other way may use stealing bits to signal ciphered and non-ciphered blocks. Both ways may desire a new type of mobile station, and signaling of this capability in the classmark indication. An error made here is to assume that the content of ciphered messages is unpredictable, making it impossible to extract the cipher text. This however may not hold true, for example if the attacker sent the SM (short message, or SMS). Then the attacker again may know plain text from which the cipher text can be extracted, and, consequently, the rest of the phone call may be decrypted. And the transmission of SM may be repeated many times during a phone call, giving the attacker more than one sample of ciphered known text at hand. The only difference is, that the attacker has to know the phone number of the attacked person, and has to actively send one or more SMSes, while otherwise it was sufficient to passively record the ciphered phone call. But this is not seen as a major obstacle, there are methods known how to send a SMS, while still staying anonymous.

According to various embodiments, plain text may be understood as unciphered, directly (machine-) readable text.

According to various embodiments, cipher text may be understood as a bit sequence (for example normally pseudo random) used for encrypting plain text.

According to various embodiments, encrypted text may be understood as plain text after applying encryption: for example e=f(t,c), where f may be an exclusive-or operation: e=t xor c, and where e may be the encrypted text, c may be the cipher text, and t may be the plain text.

According to various embodiments, a cipher key may be understood as a key, for example in GSM derived by the A3/A8 method from a challenge sent during call setup by the network, used as input to the cipher text generation.

It will be understood that "text" may not mean text in the commonly used sense, but any kind of data.

According to various embodiments, a challenge may be sent from the network to the mobile station, and the mobile station may send back a response and a cipher key. Then, by a function (which may be referred to as ciphering function) known to both the network and the mobile station, the cipher text may be derived from the cipher key, and the data to be encrypted may be encrypted using the cipher text, for example by an exclusive or function of the data to be encrypted and the cipher text. Both the network and the terminal may execute the A3 and A8 methods on the same challenge, resulting in identical results, so that the terminal and the network then may have the same signature response and cipher key available. While the signature response may be sent back to the network (for example for serving for authentication of the user), the cipher key may remain concealed in the terminal and may not be sent back to the network.

According to various embodiments, SI messages may be sent unciphered on SACCH, and SMS (and SS) may be sent ciphered, but the ciphering on SACCH may be decoupled from the ciphering on TCH. According to various embodiments, for SACCH messages which have to be ciphered a cipher key different from the one used on TCH may be used.

According to various embodiments, the need for signaling may be kept low, and the cipher key used on SACCH may be derived from the one used on TCH by a defined method f (in other words: function f):

$$ck_{SACCH}=f(ck_{TCH}).$$

The method f may be executed in parallel in the base station as well as in the mobile station. This may not introduce any additional signaling on the air interface.

According to various embodiments, the method f may be designed as such, that the inverse function $f^{-1}$ is hard, or nearly impossible, to implement, which may make attacks using pre-calculated tables unfeasible. One such function may be the ciphering function itself. According to various embodiments, the function f may be a function according to SHA-1 (secure hash algorithm 1). According to various embodiments, the cipher key used on SACCH may be derived by ciphering the key used on TCH. To this end, the cipher method A5/1 may be used to produce one block of cipher text, using the cipher key (ck) used on TCH and a defined frame number, e.g. the one of the first burst of the cipher mode command sent by the network. The 64 bits of the cipher text may be used to derive the cipher key $ck_{SACCH}$ by "ciphering" the cipher key $ck_{TCH}$:

$$ck_{SACCH}(i)=ck_{TCH}(i) \text{ xor } c(i)$$

where c may be the cipher text, where an i in brackets may denote the i-th bit of the respective data, where for example i may be between 1 and 64.

According to various embodiments, instead of using A5/1 for producing cipher text, one of the GPRS methods GEA1 or GEA3 may be used, but although GPRS may be widely used, it may not be guaranteed that GPRS cipher methods are available on "voice only" mobile phones.

According to various embodiments, the first ciphering method and the second ciphering method may be different only in a ciphering key used.

According to various embodiments, a first challenge may be executed for acquiring the first ciphering key, and a second challenge may be executed for acquiring the second ciphering key.

According to various embodiments, only one challenge may be executed, and the challenge may be executed for acquiring the first ciphering key. According to various embodiments, the second ciphering key may be acquired based on the first ciphering key, for example by modifying the first ciphering key, for example in a way that an attacker may not know the second ciphering key, even if he would know the first ciphering key.

According to various embodiments, a cipher key for encryption on SACCH may be determined by letting the network (for example a mobile radio communication network device) determine one cipher key (for example by a pre-determined method, which for example may be operator specific) and send this cipher key over an already ciphered (and therefore secure) channel to the mobile radio communication device. Such channels may be SDCCH (stand alone dedicated control channel) and/or FACCH (fast associated control channel).

According to various embodiments, SMS data on the SACCH may be encrypted (for example on a higher communication layer) based on the ciphering key for the SACCH, and other data on the SACCH may not be encrypted.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data transmitting device, comprising:
   a ciphering method selector configured to select a ciphering method from a plurality of ciphering methods based on a type of data to be transmitted, the plurality of ciphering methods comprising a first ciphering method and a second ciphering method;
   a ciphering circuit configured to cipher the data based on the selected ciphering method;
   a data type determiner configured to determine the type of data to be transmitted;
   a transmitter configured to transmit the ciphered data to a data receiving device;
   a ciphering method information receiver configured to receive information indicating the first ciphering method and indicating a first ciphering key; and
   a second ciphering method determiner configured to determine the second ciphering method based on the received information indicating the first ciphering method and configured to determine a second ciphering key from the first ciphering key, wherein the first ciphering key is different from the second ciphering key,
   wherein the second ciphering method using the second ciphering key is selected to cipher data to be sent on a Slow Associated Control Channel (SACCH) and wherein the first ciphering method using the first ciphering key is selected to cipher data to be sent on a Traffic Channel (TCH),
   wherein determining the second ciphering key comprises deriving the second ciphering key from the first ciphering key by ciphering the first ciphering key.

2. The data transmitting device of claim 1,
   wherein the type of data to be transmitted is based on the channel on which the data is to be transmitted.

3. A data receiving device, comprising:
   a receiver configured to receive ciphered data from a data transmitting device;
   a deciphering method selector configured to select a deciphering method from a plurality of deciphering methods based on a type of the ciphered data, the plurality of deciphering methods comprising a first deciphering method and a second deciphering method;
   a data type determiner configured to determine the type of the ciphered data;
   a deciphering circuit configured to decipher the ciphered data based on the selected deciphering method;
   a deciphering method information receiver configured to receive information indicating the first deciphering method and indicating a first deciphering key; and
   a second deciphering method determiner configured to determine the second deciphering method based on the received information indicating the first deciphering method and configured to determine the second deciphering key from the first deciphering key, wherein the first deciphering key is different from the second deciphering key, wherein the second deciphering method using the second deciphering key is selected to decipher ciphered data received on a Slow Associated Control Channel (SACCH) and wherein the first deciphering method using the first deciphering key is selected to decipher ciphered data received on a Traffic Channel (TCH), wherein the second deciphering key is derived from the first deciphering key by ciphering the first deciphering key.

4. The data receiving device of claim 3,
wherein the type of the ciphered data is based on the channel on which the ciphered data is received.

5. A data transmitting device, comprising:
a channel determiner configured to determine a channel on which the data is to be transmitted to a data receiving device;
a ciphering method selector configured to select a ciphering method from a plurality of deciphering methods based on the determined channel, the plurality of deciphering methods comprising a first deciphering method and a second deciphering method;
a ciphering circuit configured to cipher the data based on the selected ciphering method;
a transmitter configured to transmit the ciphered data to the data receiving device;
a ciphering method information receiver configured to receive information indicating the first ciphering method and indicating a first ciphering key; and
a second ciphering method determiner configured to determine the second ciphering method based on the received information indicating the first ciphering method and configured to determine a second ciphering key from the first ciphering key, wherein the first ciphering key is different from the second ciphering key and wherein determining the second ciphering key comprises deriving the second ciphering key from the first ciphering key by ciphering the first ciphering key;
wherein the second ciphering method using the second ciphering key is selected to cipher data to be sent on a Slow Associated Control Channel (SACCH) and wherein the first ciphering method using the first ciphering key is selected to cipher data to be sent on a Traffic Channel (TCH).

6. A non-transitory computer storage medium containing instructions for controlling a data transmitting device, wherein execution of the instructions by one or more processors causes the one or more processors to carry out steps comprising:
determining the type of data to be transmitted;
selecting a ciphering method from a plurality of ciphering methods based on a type of data to be transmitted, the plurality of ciphering methods comprising a first ciphering method using a first ciphering key and a second ciphering method using a second ciphering key, wherein the second ciphering method is selected to cipher data to be sent on a Slow Associated Control Channel (SACCH) and wherein the first ciphering method is selected to cipher data to be sent on a Traffic Channel (TCH);
ciphering the data based on the selected ciphering method;
transmitting the ciphered data to a data receiving device;
receiving information indicating the first ciphering method and the first ciphering key; and
determining the second ciphering method based on the received information indicating the first ciphering method and determining the second ciphering key from the first ciphering key, wherein the first ciphering key is different from the second ciphering key,
wherein determining the second ciphering key comprises deriving the second ciphering key from the first ciphering key by ciphering the first ciphering key.

7. The computer storage medium of claim 6,
wherein the type of data to be transmitted is based on the channel on which the data is to be transmitted.

8. A non-transitory computer storage medium containing instructions for controlling a data transmitting device, wherein execution of the instructions by one or more processors causes the one or more processors to carry out steps comprising:
receiving ciphered data from a data transmitting device;
determining a type of the ciphered data;
selecting a deciphering method from a plurality of deciphering methods based on the type of the ciphered data, the plurality of deciphering methods comprising a first deciphering method using a first deciphering key and a second deciphering method using a second deciphering key, wherein the second deciphering method is selected to decipher ciphered data received on a Slow Associated Control Channel (SACCH) and wherein the first deciphering method is selected to decipher ciphered data received on a Traffic Channel (TCH); and
deciphering the data based on the selected deciphering method;
receiving information indicating the first deciphering method and the first deciphering key; and
determining the second deciphering method based on the received information indicating the first deciphering method and determining the second deciphering key from the first deciphering key, wherein the first deciphering key is different from the second deciphering key,
wherein determining the second deciphering key comprises deriving the second deciphering key from the first deciphering key by ciphering the first deciphering key.

9. The computer storage medium of claim 8,
wherein the type of the ciphered data is based on the channel on which the ciphered data is received.

* * * * *